United States Patent
Nanda et al.

(10) Patent No.: US 9,020,987 B1
(45) Date of Patent: Apr. 28, 2015

(54) MANAGING UPDATING OF METADATA OF FILE SYSTEMS

(75) Inventors: Kumari Bijayalaxmi Nanda, Iselin, NJ (US); Sitaram Pawar, Shrewsbury, MA (US)

(73) Assignee: EMC Corporation, Hopkinton, MA (US)

(*) Notice: Subject to any disclaimer, the term of this patent is extended or adjusted under 35 U.S.C. 154(b) by 212 days.

(21) Appl. No.: 13/171,869

(22) Filed: Jun. 29, 2011

(51) Int. Cl.
*G06F 7/00* (2006.01)
*G06F 17/00* (2006.01)
*G06F 17/30* (2006.01)

(52) U.S. Cl.
CPC ................. *G06F 17/30289* (2013.01)

(58) Field of Classification Search
CPC .............. G06F 17/30067; G06F 17/30289; G06F 17/30; G06F 17/30011; G06F 17/30017; G06F 17/30132
USPC ............... 707/769, 683; 711/162, 203
See application file for complete search history.

(56) References Cited

U.S. PATENT DOCUMENTS

| | | | |
|---|---|---|---|
| 5,996,054 A * | 11/1999 | Ledain et al. | 711/203 |
| 7,383,285 B1 * | 6/2008 | Pal et al. | 1/1 |
| 7,734,885 B2 * | 6/2010 | Shackelford | 711/162 |
| 7,783,615 B1 * | 8/2010 | Compton et al. | 707/694 |
| 7,873,619 B1 * | 1/2011 | Faibish et al. | 707/705 |
| 8,239,356 B2 * | 8/2012 | Giampaolo et al. | 707/695 |
| 2007/0087756 A1 * | 4/2007 | Hoffberg | 455/450 |
| 2007/0179934 A1 * | 8/2007 | Basov et al. | 707/3 |
| 2007/0192374 A1 * | 8/2007 | Abnous et al. | 707/200 |
| 2011/0131231 A1 * | 6/2011 | Haas et al. | 707/769 |
| 2011/0184918 A1 * | 7/2011 | Atluri et al. | 707/683 |

* cited by examiner

*Primary Examiner* — Susan Chen
(74) *Attorney, Agent, or Firm* — Deepika Bhayana; Jason A. Reyes; Krishnendu Gupta

(57) ABSTRACT

A method is used in managing updating of metadata of file systems. Changes in metadata of a file of a file system are stored in a journal upon receiving an I/O request for the file of the file system. The I/O request results in update of metadata of the file of the file system. The journal includes metadata transactions upon the file system. Changes to metadata of the file are stored in a volatile memory of a data storage system upon receiving subsequent I/O requests resulting in update of metadata of the file of the file system. Metadata of the file of the file system is updated with information derived from metadata changes stored in the journal.

18 Claims, 11 Drawing Sheets

MANAGING UPDATING OF METADATA OF FILE SYSTEMS

BACKGROUND

1. Technical Field

This application relates to managing updating of metadata of file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be as many as five levels of indirect blocks arranged in an hierarchy depending upon the size of a file where each level of indirect blocks includes pointers to indirect blocks at the next lower level.

A file systems store a number of timestamps for each file of the file system. The timestamps may be used to find out when a file or directory was last accessed (read from or written to), changed (file access permissions were changed) or modified (written to). When a file is modified, a timestamp such as a last modification time of the file is updated to indicate the time at which contents of the file have been modified. The last modification time (also referred to simply as "mtime") of a file does not change when attributes such as an owner or a permission settings of the file changes. Thus, the mtime attribute of a file is used for tracking changes to contents (or data) of the file because mtime of the file changes every time contents of the file are modified. Further, the mtime attribute is a part of metadata of a file.

The accuracy and consistency of a file system is necessary to relate applications and data used by those applications. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Generally, data and metadata of a file of a file system read from a disk and written to a disk may be cached in a volatile memory such as a system cache of a data storage system. Caching of data and metadata of a file implies that read operations read data and metadata of the file from the volatile memory, rather than from a disk. Correspondingly, write operations may write data and metadata of a file to the volatile memory rather than to a disk. Data and metadata of a file cached in the volatile memory is written to the disk at intervals determined by an operating system of the data storage system, which is referred to as flushing of a cache. Flushing of a cache is triggered at a determinate time interval. Caching data and metadata of a file of a file system in a volatile memory improves performance of the file system as accessing data from a disk involves an I/O operation to a disk which is slower than accessing data from the volatile memory.

A write I/O request using a "file sync" option requires that a write operation directed to a file writes both data and metadata immediately to a disk rather than incurring a delay. However data and metadata may still be written into a cache. On the other hand, a write I/O request using a "data sync" option requires that data is written immediately to a disk but metadata may be cached and flushed to the disk at a later time.

Further, the frequency at which a cache is flushed in a data storage system affects performance and reliability of the data storage system. If the data storage system flushes the cache too often, performance of the data storage system degrades significantly as a large number of disks I/Os are performed to write data to a disk. If the data storage system does not flush the cache often enough, a volatile memory of the data storage system may be depleted by the cache, or a sudden system failure (such as a loss of power) may cause the data storage system to lose data stored in the cache.

SUMMARY OF THE INVENTION

A method is used in managing updating of metadata of file systems. Changes in metadata of a file of a file system are stored in a journal upon receiving an I/O request for the file of the file system. The I/O request results in update of metadata of the file of the file system. The journal includes metadata transactions upon the file system. Changes to metadata of the file are stored in a volatile memory of a data storage system upon receiving subsequent I/O requests resulting in update of metadata of the file of the file system. Metadata of the file of the file system is updated with information derived from metadata changes stored in the journal.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
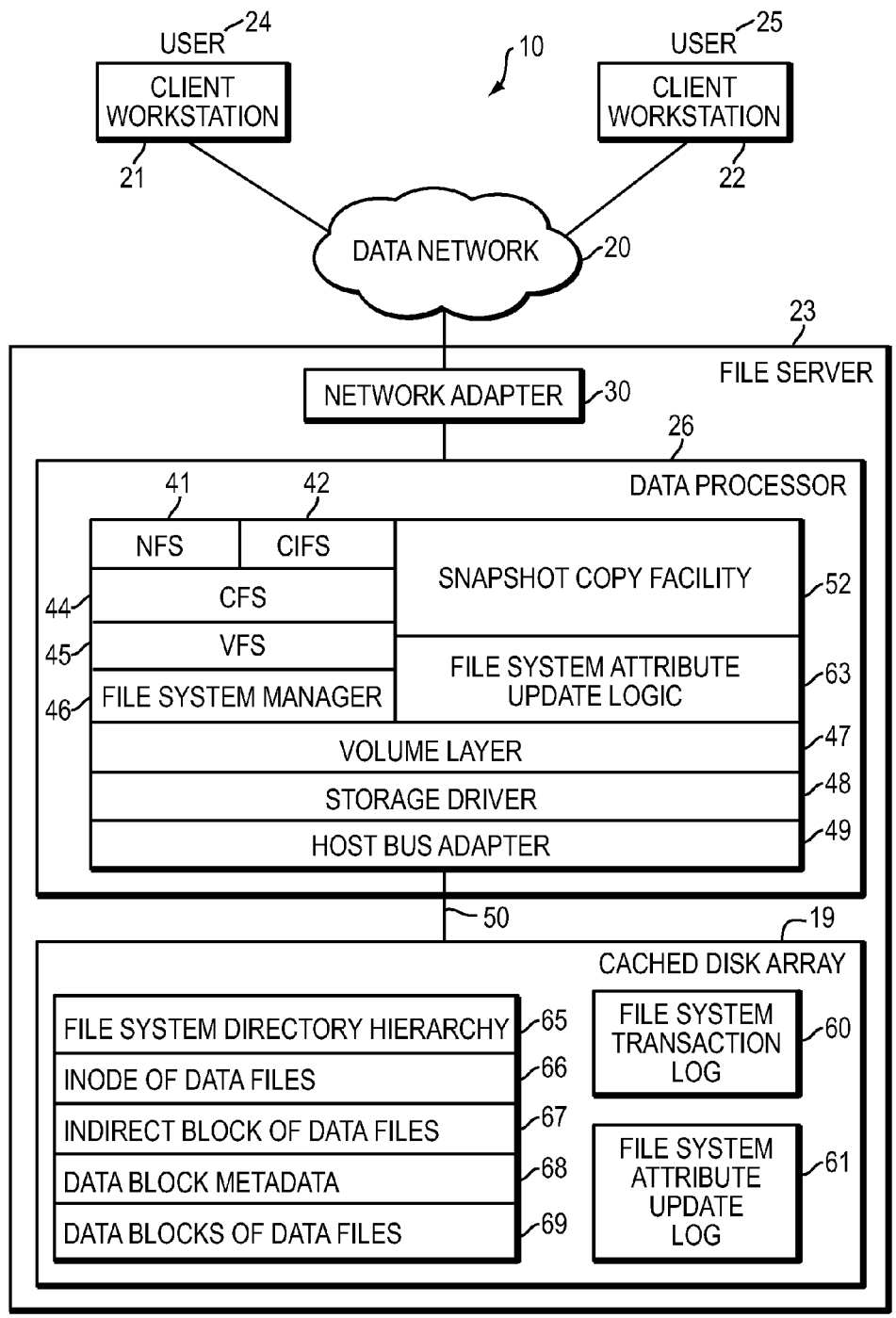
FIG. 1 is an example of an embodiment of a computer system that may utilize the techniques described herein.

Described below is a technique for use in managing updating of metadata of file systems in data storage systems, which technique may be used to provide, among other things, storing changes to metadata of a file of a file system in a journal upon receiving an I/O request that may result in update of metadata of the file, storing changes to metadata of the file in a volatile memory of a data storage system upon receiving subsequent I/O requests, and updating metadata of the file on a persistent storage with information derived from metadata changes stored in the journal.

Conventionally, one of the mechanisms used to ensure that metadata of a file of a file system is correctly written and ordered on a persistent storage (e.g., disks) is by using a persistent write-cache module. In such a conventional system, changes to metadata resulting from a write operation directed to a file are stored on the persistent write-cache module and eventually transferred to the persistent storage, preferably before a subsequent read operation. However, in such a conventional system, using the persistent write-cache module involves a substantial cost because the persistent write-cache module is created by using hardware components. Further, conventionally, a second mechanism used to ensure that metadata of a file of a file system is correctly written and ordered on a persistent storage is by combining a number of write operations directed to a file in a single I/O transaction, combining all changes to metadata resulting from the number of write operations in a single metadata transaction, and executing the single I/O and metadata transactions to update the file system stored on the persistent storage. However, in such a conventional system, not many write operations may be combined together in a single transaction because an amount of time required to complete a single transaction increases as the number of write operations combined together in the single transaction increases. Further, conventionally, a third mechanism used to ensure that metadata of a file of a file system is correctly written and ordered on a persistent storage is by storing changes to metadata of a file in a volatile memory upon receiving a write operation directed to a file and flushing metadata changes from the volatile memory to the persistent storage when a file system synchronization (also referred to as "fsync") operation is issued. The fsync is a system operation that transfers all modified data and metadata (such as attributes) of a file from a volatile memory to a persistent storage. The fsync operation results in writing all metadata changes stored in the volatile memory to the persistent storage. A data storage system caches changes to metadata of a file in a volatile memory (e.g. a block buffer cache) in order to reduce the number of I/O operations performed on a disk. However, in such a conventional system, the changes to metadata stored in the volatile memory are lost when the data storage system crashes due to a failure, which may cause the file to be inconsistent when the data storage system restarts after the failure because contents of the file may have changed before the failure but associated metadata changes (such as mtime) may not have been transferred from the volatile memory to the file stored on a persistent storage.

By contrast, in at least some implementations in accordance with the current technique as described herein, storing an initial change in metadata of a file of a file system in a persistent journal, and storing subsequent changes to metadata of the file of the file system in a volatile memory does not require any new hardware components. Further, in at least some implementations in accordance with the current technique as described herein, metadata of a file of a file system may reliably be updated in case of a failure of a data storages system by updating metadata of the file of the file system stored on a persistent storage with information stored in the persistent journal.

By contrast, in at least some implementations in accordance with the technique as described herein, the use of the managing updating of metadata of file systems technique can provide one or more of the following advantages: reducing I/O load on a data storage system by reducing a number of times metadata changes are flushed on a persistent storage, increasing a write I/O performance by reducing a write latency for large file systems, and lowering a storage cost by removing or reducing the need to maintain metadata changes in a persistent cache.

In some embodiments, the current technique can be used to improve I/O performance in a case in which a data storage system such as a file server maintains large file systems (e.g., a virtual machine image, a virtual machine device, large data bases). Typically, large file systems such as virtual images and devices are accessed by file system protocols (e.g., NFS, CIFS, iSCSI) and are updated at a rapid pace. However, write I/O operations on such large file systems often includes modification of existing contents of files of such large file systems, and/or writing data to a portion of a storage that is pre-allocated for such large file systems. Further, in such a case, applications that access such large file systems uses the "data sync" option to update contents of files of such large file systems. A write I/O operation using the "data sync" option writes changes to contents (or data) of a file of a large file system to a persistent storage (e.g., disk) directly as part of the write I/O operation. Thus, in such a case, if using a conventional technique, changes to metadata (e.g., changes in mtime attribute) of a file are committed to a file system transaction log as part of each write I/O operation performed on the file. Therefore, using the conventional technique in such a case may cause a high write latency and a low I/O performance when a transaction including a change in the mtime attribute of a file is logged in the file system transaction log each time a write I/O operation is performed on the large file system. Thus, in such a case, the current technique as described herein can be used to improve I/O performance and decrease write latency by logging a change in the mtime attribute of a file in the file system transaction log only for a first write I/O request, storing changes in the mtime attribute of the file in a volatile memory for subsequent write I/O requests, periodically flushing the changes to metadata stored in the volatile memory to the file stored on a persistent storage at a specific time interval, and recovering the file in case of a failure by using metadata information stored in the file system transaction log.

Referring now to FIG. 1, shown is an example of an embodiment of a data storage system that may be used in connection with performing the technique or techniques described herein. The data storage system 10 includes a data network 20 interconnecting clients 21, 22 and servers such as a network file server 23 (also referred to simply as "file server"). The data network 20 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 20 via a data transmission protocol such as TCP/IP. The data processor 26 is programmed with a Network File System (NFS) module 41 for supporting communication with network clients over the data network 20 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 1, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The snapshot copy facility 52 performs a copy-on-first-write to each block in a production volume, in order to save an old version ("before image") of the changed block in a snapshot volume. Details regarding such a snapshot copy facility 52 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 20 may be any one or more of a variety of networks or other type of communication connections as known to those skilled in the art. For example, the data network 20 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 20 by any one of a variety of connections as may be provided and supported in accordance with the type of data network 20.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 1, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 1 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 1, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Conventionally, any change in metadata of a file system is first written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60. In at least one embodiment of the current technique, data storage system 10 may also include a persistent log such as file system attribute update log 61 that records changes to metadata of a file of a file system. Metadata information stored in file system attribute update log 61 is later applied to the file system stored on a persistent storage device. In at least one embodiment of the current technique, file system attribute update logic 63 stores changes to metadata of a file of a file system in a volatile memory of data storage system 10 upon receiving write I/O requests directed to the file of the file system, and periodically updates metadata of the file of the file system stored on a persistent storage at specific time interval.

Figure 2A:
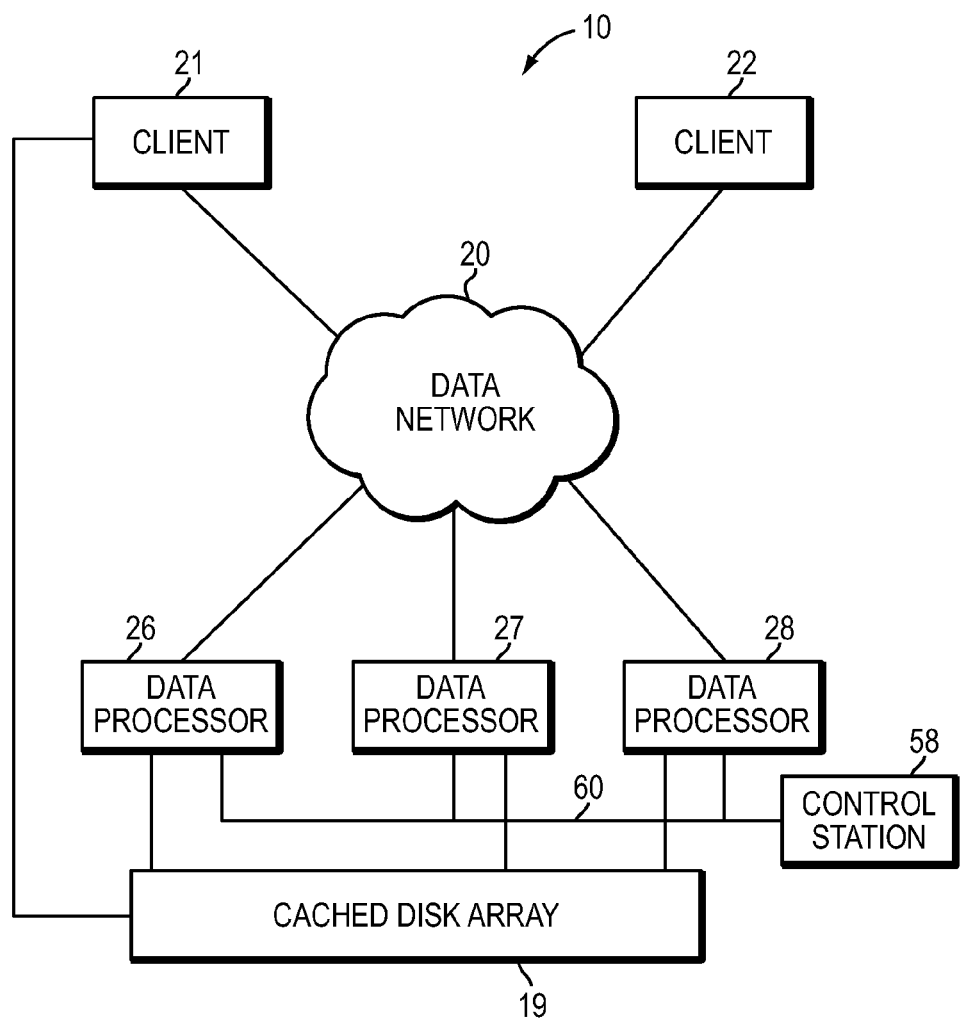
FIGS. 2A and 2B are examples of an embodiment of a computer system that may utilize the techniques described herein.

Referring now to FIG. 2A, shown is the network file server 23 of FIG. 1 that may further include a control station 58 and additional data processors (such as data processors 26, 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 2B:
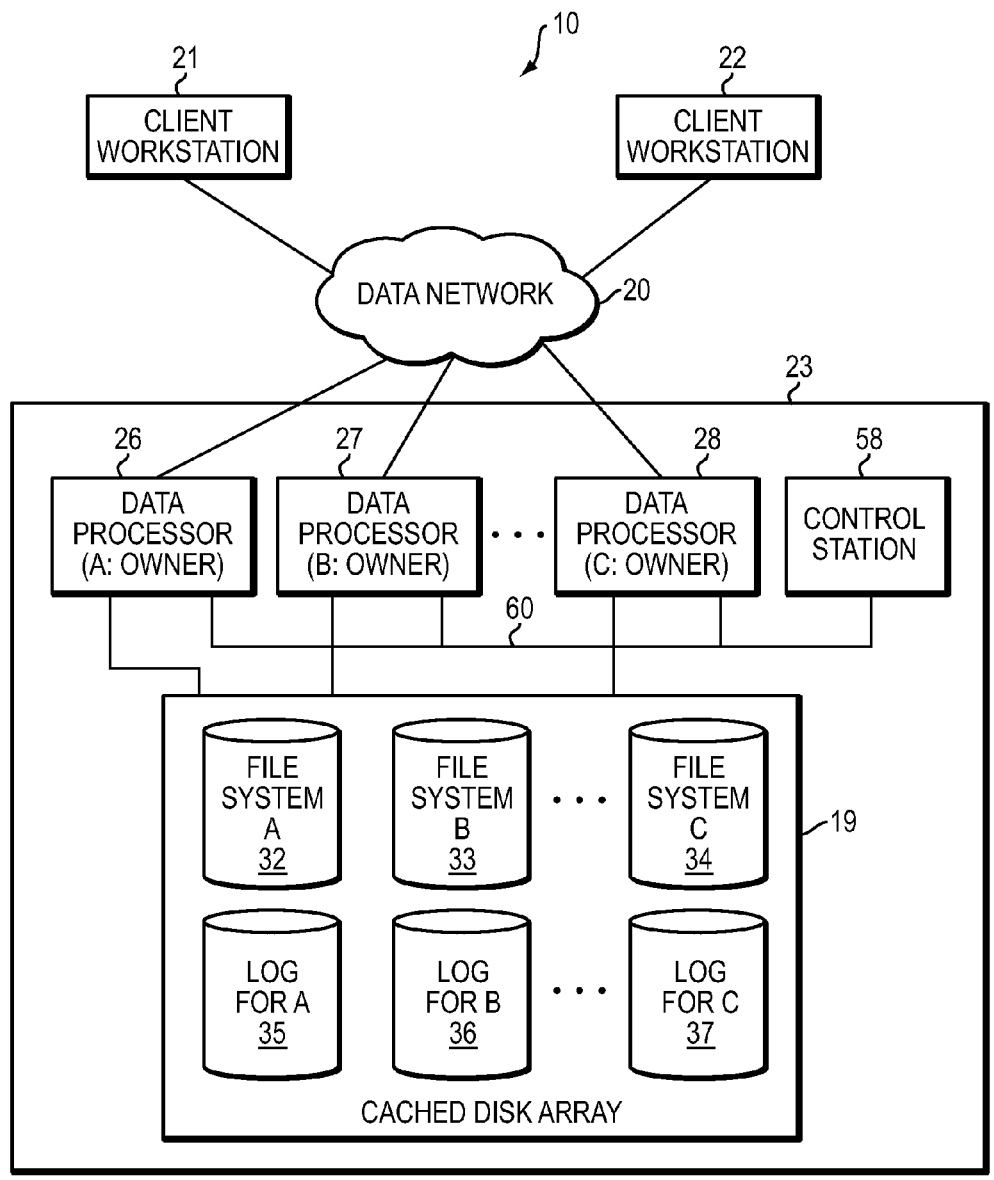

Referring now to FIG. 2B, shown is the network file server 23 of FIG. 1 that may further include file systems and file system transaction logs associated with respective file systems. Clients 21, 22 of file server 23 may access the same file stored in a persistent storage device of the cached disk array 19 from any of the data processors 26, 27, 28. To ensure data consistency in such a case, a respective one of the data movers is designated as the exclusive owner of each file system for the purpose of granting read-write access to the file system. For example, files stored in a persistent storage device of the cached disk array 19 are organized into disjoint file systems such as the file system 32 named "A" and owned by the data processor 26, the file system 33 named "B" and owned by the data processor 27, and the file system 34 named "C" and owned by the data processor 28. For recovery purposes, each file system has an associated file system transaction log (also referred to simply as "log") stored on a persistent storage device of the cached disk array 19. Thus, the file system named "A" has a log 35, the file system named "B" has a log 36, and the file system named "C" has a log 37.

Figure 3:
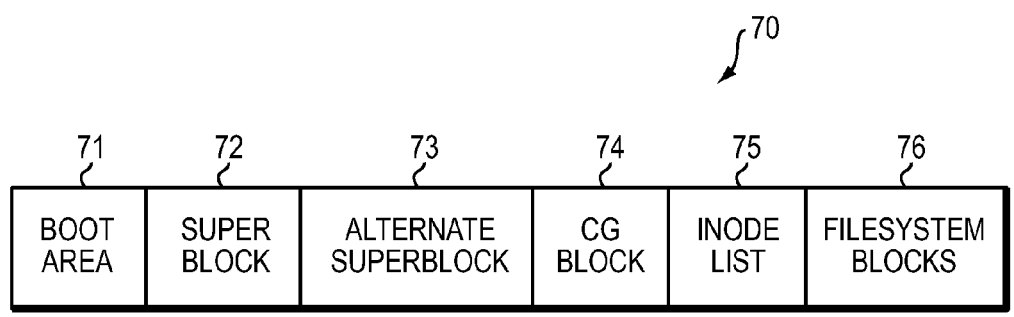
FIGS. 3-7 are a diagram illustrating in more detail components that may be used in connection with techniques herein.

Referring to FIG. 3, shown is a representation of an on-disk layout of a file system that may be included in an embodiment using the current techniques described herein. A file system 70 includes a boot area 71, a superblock 72, an alternate superblock 73, Cylinder Group Block (CG) block 74, an inode list 75, and file system blocks 76. The boot area 71 may contain code for booting an operating system of file server 23. The superblock 72 and alternate super block 73 contains attributes and metadata of the file system. Cylinder Group Block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file.

Figure 4:
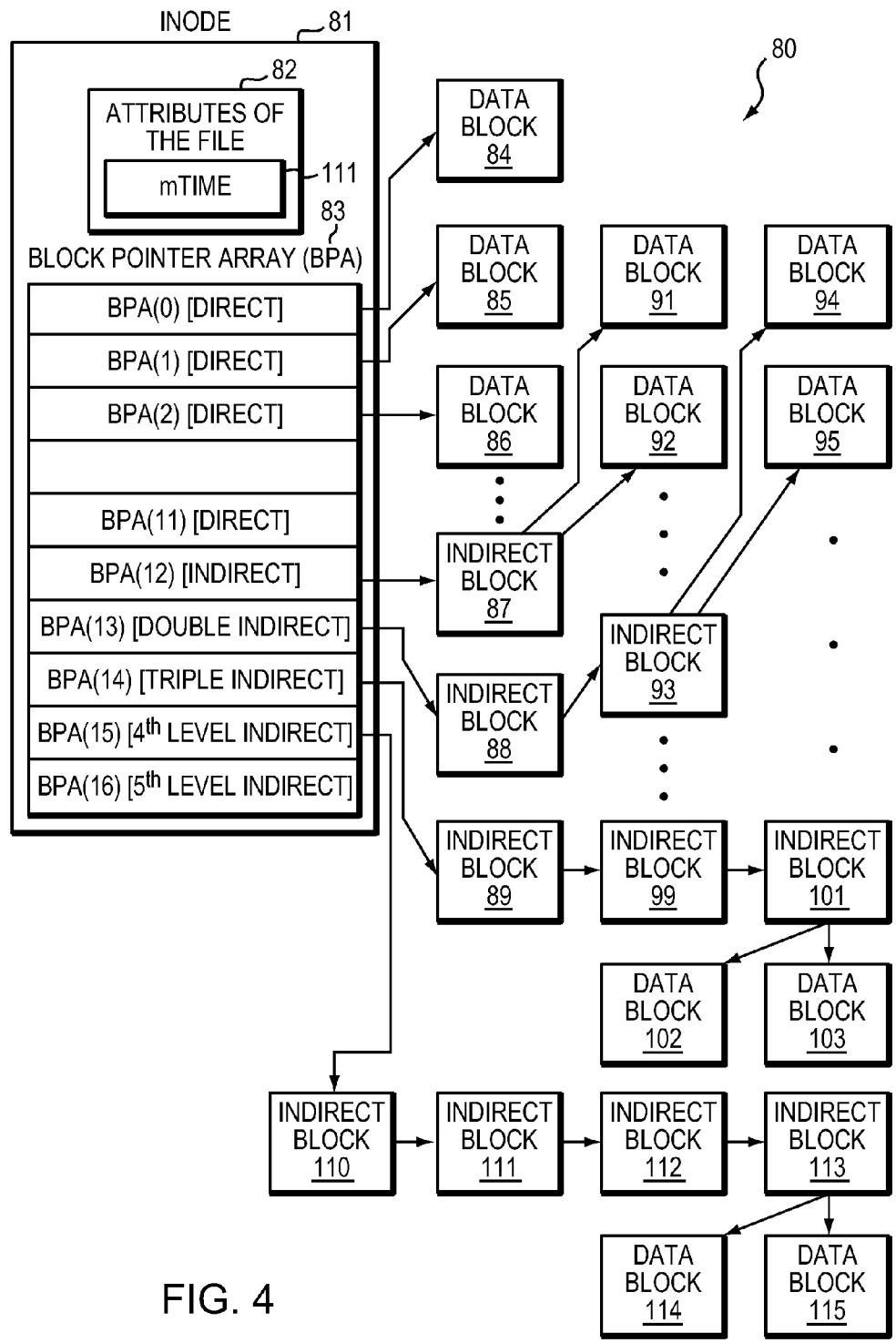

Referring to FIG. 4, shown is a representation of an inode of a file that may be included in an embodiment using the techniques described herein. A file includes an inode 81 containing attributes 82 of the file, and a block pointer array 83. The block pointer array 83 has seventeen block pointer array entries BPA(0) to BPA(16). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 99 that points to an indirect block 101 that points to one or more additional data blocks (e.g., 102, 103). Similarly the file may include fourth (BPA(15)) and fifth (BPA(16)) level of indirections indicated by indirect blocks 110-113 and data blocks 114-115. The attributes 82 of the file include timestamps such as a last modification time 111 that indicates the time at which the file has been last modified.

Metadata changes of a file system resulting from an I/O request may be directly written to the file system stored on a disk, or recorded in a file system transaction log. A file system transaction log is used to improve performance, reliability, and recovery times of file systems. A file system transaction log of a file system offers increased reliability, because the file system transaction log may replicate some or all of the file system data and metadata which can be applied to the file system at a later time in order to make the file system metadata consistent with changes applied to data of the file system. However, frequent and recurring updates to a file system may fill up a file system transaction log.

Typically, a file system transaction log only stores changes to metadata objects (such as inodes, directories, allocation maps) of a file system. If file server 23 shuts down without a failure, the file system transaction log can be discarded, because the file system stored on a persistent storage in such a case is consistent and includes all metadata changes stored in the file system transaction log. However, when file server 23 shuts down due to a failure, the file system transaction log is used to rebuild the file system in order to restore the file system to a consistent state. Generally, all write operations resulting in changes to metadata of a file system are first stored in the file system transaction log and corresponding metadata structures stored on a persistent storage are updated at a later time when metadata changes stored in a cache are written (or flushed) to the persistent storage. Thus, metadata structures stored on the persistent storage may contain stale data that is not consistent with metadata changes stored in the file system transaction log. Therefore, in such a case, the metadata changes stored in the file system transaction log are applied to the metadata structures stored on the persistent disk to recover the file system to a consistent state. The process of recovering the file system to a consistent state by applying metadata changes stored in the file system transaction log to the persistent storage is known as "replay of a file system transaction log".

Conventionally, in a data storage system 10, each metadata update is written to a persistent storage twice; first time to a file system transaction log, and second time to corresponding metadata structures on the persistent storage (also referred to as "in-place update"). However, in-place updates are often eliminated or batched together because updates to metadata structures on the persistent storage are delayed when the file system transaction log is used to record changes to metadata. For example, an inode may be modified several times before it is written to the persistent storage, and thus multiple inodes stored in the same disk block may be written together in a single transaction. Similarly, write operations to the file system transaction log may be batched together in one transaction as well. For example, a file system operation such as "create file" includes changes to metadata of a directory under which a file is created, and changes to inodes of the file and the directory, which can be combined in a single file system transaction. Similarly, multiple operations that are temporally close to each other may be batched together as a single transaction. Combining multiple operations together reduces the total number of disk writes for metadata blocks. In at least one embodiment of the current technique, multiple changes to metadata of a file system are batched together by storing only an initial change to metadata in the file system transaction log and using a volatile memory to store subsequent changes to metadata.

File system operations such as "setattr", "write", "link", "symlink", "create", "remove", "mkdir", "rmdir", and "rename" result in changes to metadata of a file system because these operations modify the file system. Each of these file system operations results in changes to metadata.

Figure 5:
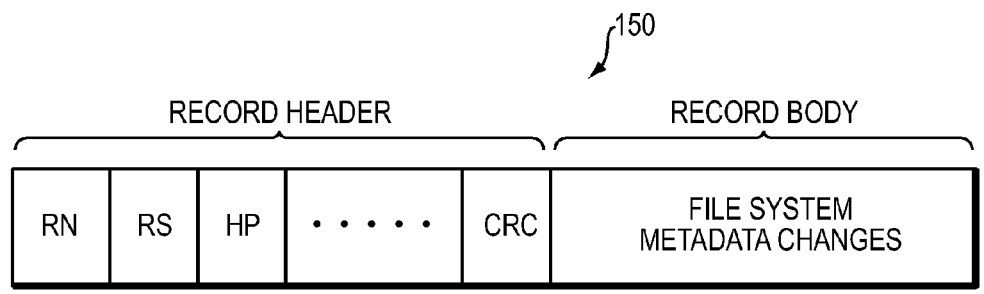

Referring to FIG. 5, shown is a logical representation of a log entry (also referred to as a "transaction record") of a file system transaction log that may be included in an embodiment using the techniques described herein. The file system transaction log includes a set of log entries where each log entry includes changes to metadata associated with a file system operation (e.g. a NFS request) sent by a client connected to file server 23. A log entry 150 includes a record header and a record body. The record body of log entry 150 contains changes to metadata of a file system resulting from a transaction including a file system operation performed on the file system. The record header of log entry 150 includes a record number (RN), a record size (RS), a head pointer (HP), and a number of additional fields. The last field of the header is a cyclic redundancy check (CRC). The CRC, for example, is a thirty-two bit CRC known as "CRC32" computed by calling an operating system utility routine.

Figure 6:
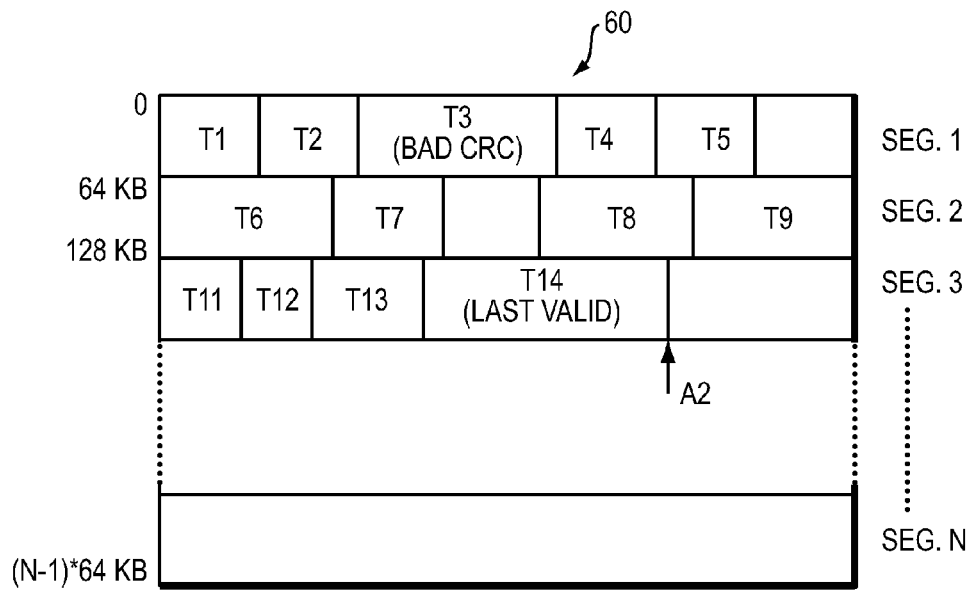

Referring to FIG. 6, shown is a logical representation of a file system transaction log that may be included in an embodiment using the techniques described herein. The file system transaction log 60 may be organized as a series of 64 kilobytes (KB) segments. A series of transactions T1 to T14 are shown in the file system transaction log 60. Within a buffer, the transactions are collected into segments of 64 KB so that no transaction crosses a segment boundary. For example, in at least one embodiment of the current technique, each transaction is rounded up to a multiple of 512 byte blocks because each 512 byte block are atomically written to a disk storage. Recovering the file system transaction log 60 includes replaying each log entry of the file system transaction log 60 starting from the first log entry to the last entry of the log 60, and flushing metadata changes stored in each log entry to respective metadata objects on a disk.

Figure 7:
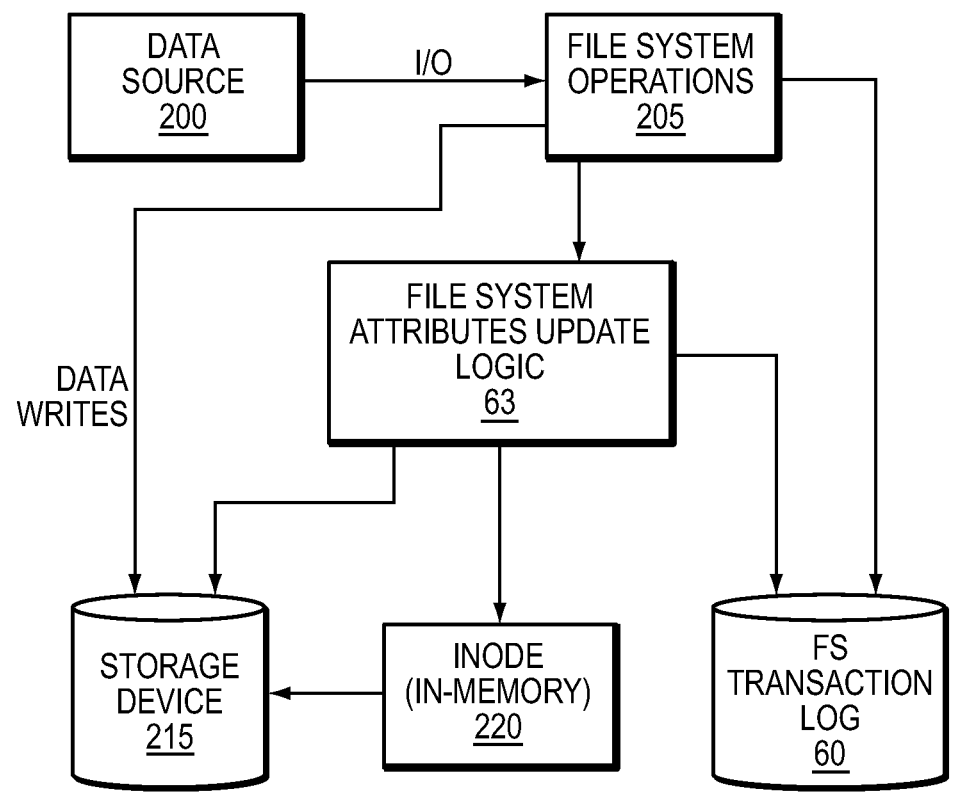

Referring to FIG. 7, shown is a more detailed representation of components that may be included in an embodiment using the techniques described herein. In at least one embodiment of the current technique, file system attributes update logic 63 provides a reliable method to batch together a set of changes to the mtime attribute of a file of a file system as a single update operation in order to improve I/O performance of the file system in data storage system 10. In at least one embodiment of the current technique, file system attribute update logic 63 stores changes to metadata of a file of a file system in an in-memory copy of the inode 220 of the file stored in a volatile memory of file server 23 for a predetermined time interval, and at the end of the predetermined time interval flushes the changes to metadata stored in the volatile memory to an on-disk representation of metadata of the file stored on storage device 215. However, file system attributes update logic 63 stores changes to metadata of the file of the file system to file system transaction log 60 where the metadata changes are associated with a first write I/O operation performed on the file at the start of the predetermined time interval. Thus, file system attributes update logic 63 maintains consistency of metadata (such as mtime attribute) of a file of a file system in case of a failure of data storage system 10 by updating the on-disk representation of metadata (e.g. mtime attribute) of the file with a value derived by adding the predetermined time interval to the metadata (e.g. mtime) stored in file system transaction log 60. Thus, if file server 23 crashes and reboots due to a system failure, metadata changes stored in the file system transaction log 60 are used to recover metadata of the file to a consistent state. In at least one embodiment of the current technique, the predetermined time interval is added to the metadata value stored in file system transaction log 60 to account for changes to metadata that may have been stored in the volatile memory but have not been flushed to the storage device 215 due to the system failure. Further, a file system operation 205 directed to a file or an I/O operation sent by data source 200 may result in changes to metadata of the file.

In at least one embodiment of the current technique, storing changes to metadata of a file of a file system in a volatile memory of a data storage system for a predetermined time interval enables the data storage system to reduce the number of transaction (such as changes in a timestamp attribute of a file) that are stored in a journal on a storage disk, and in turns, reduces a write latency for a client of the data storage system, and increase I/O performance for the client.

Figure 8:
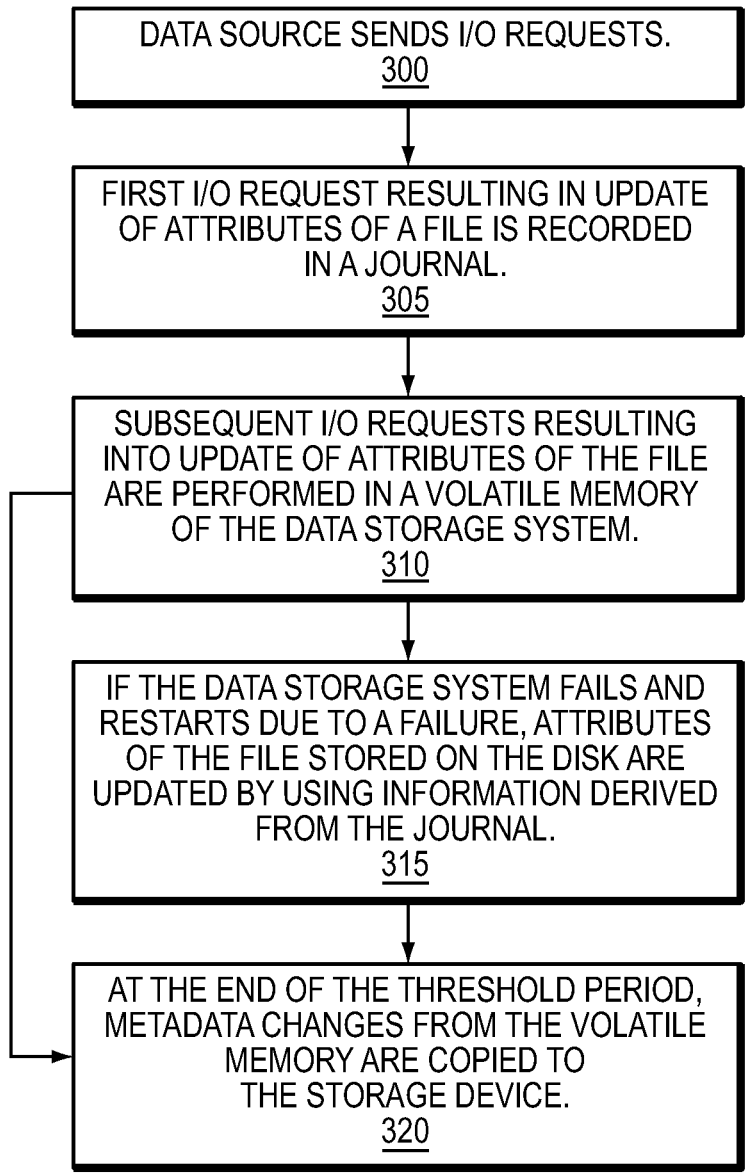
FIGS. 8-11 are flow diagrams illustrating processes that may be used in connection with techniques herein.

Referring to FIG. 8, shown is a flow diagram illustrating a flow of data in a data storage system. With reference also to FIGS. 1 and 7, data source 200 such as a NFS client sends an I/O request to file server 23 (step 300). If the I/O request is a first write request directed to a file of a file system that may result in change in metadata of the file, the metadata changes are stored in a journal such as a file system transaction log 60 associated with the file system (step 305). Changes in contents of the file associated with the write I/O request may be directly written to the file stored on storage device 215 (e.g. a disk). Metadata changes resulting from subsequent write I/O requests directed to the file of the file system are stored in a volatile memory of file server 23 instead of logging the changes in file system transaction log 60 (step 310).

File system attribute update logic 63 continues storing changes to metadata of the file resulting from subsequent write I/O requests in the volatile memory for a predetermined threshold time period. If file server 23 does not restarts or reboots due to a failure during the predetermined threshold time period, the changes to metadata stored in the volatile memory are flushed to metadata of the file stored on the storage device 215 at the end of the predetermined threshold time period (step 320). However, if file server 23 restarts or reboots due to a failure during the predetermined threshold time period, metadata (e.g., file attributes) of the file stored on the storage device 215 are updated by using information stored in the file system transaction log 60 (step 315). In at least one embodiment of the current technique, once changes to metadata are flushed from the volatile memory, a next set of changes to metadata are cached in the volatile memory for the predetermined threshold time period in such a way that an initial change in metadata resulting from a first write I/O request received from data source 200 during the predetermined threshold time period is recorded in file system transaction log 60, and subsequent changes to metadata resulting from subsequent write I/O requests during the predetermined threshold time period are stored in the volatile memory. At the end of the predetermined threshold time period, metadata changes stored in the volatile memory are flushed to metadata of the file stored on storage device 215.

Figure 9:
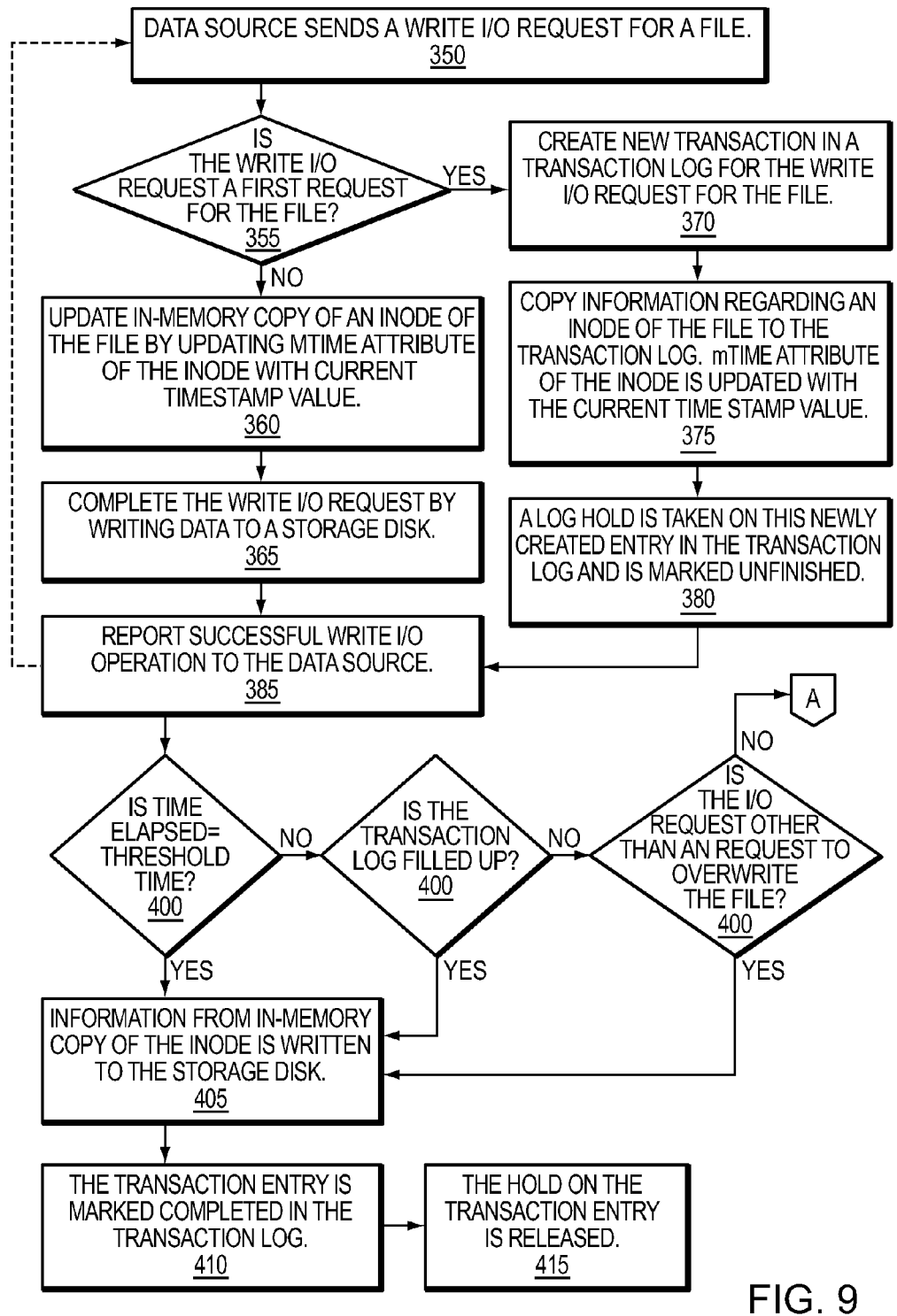
Figure 10:
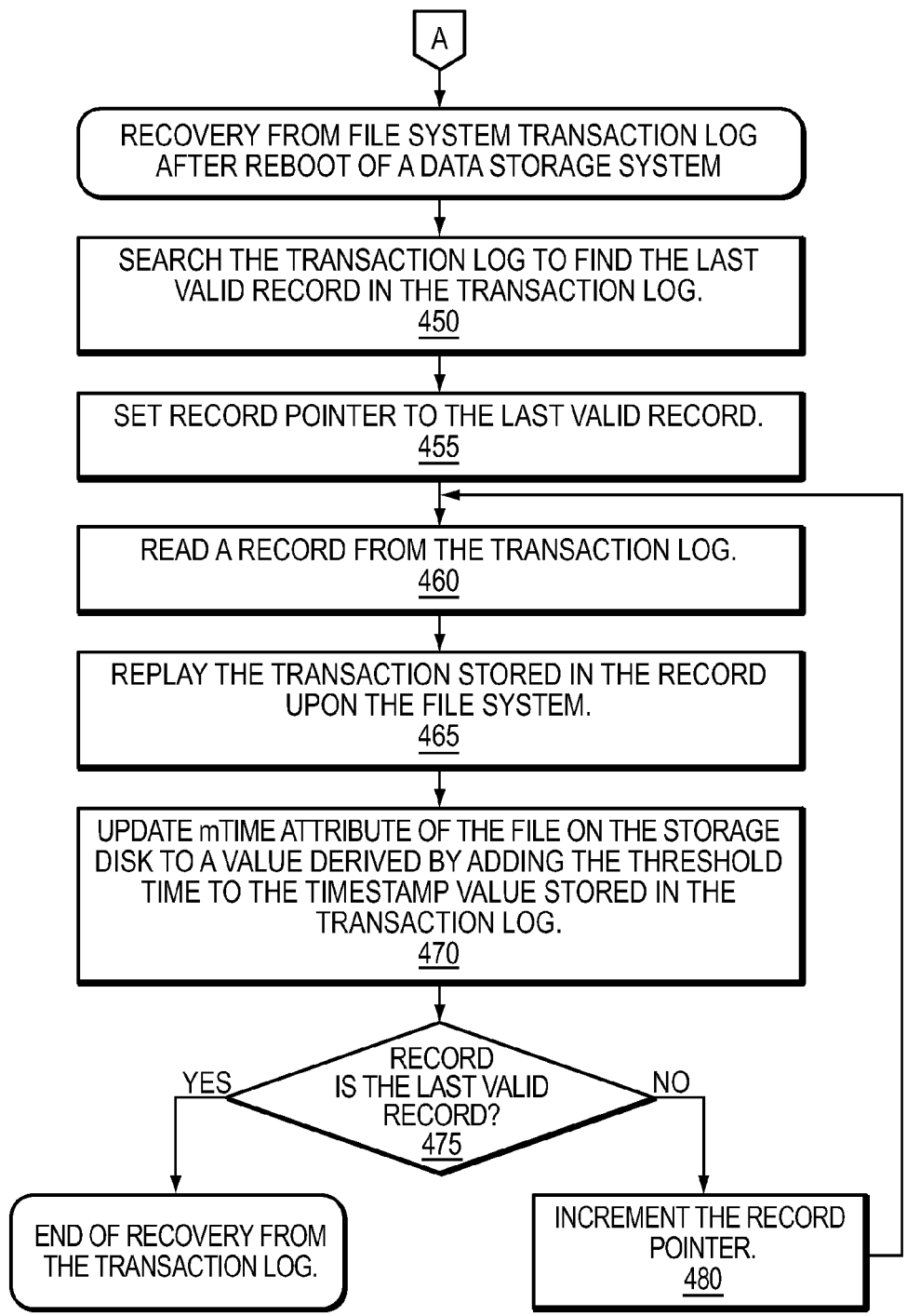

Referring to FIGS. 9 and 10, shown are more detailed flow diagrams illustrating a method of managing updating of metadata of file systems in a data storage system. With reference also to FIGS. 1 and 7, data source 200 such as a NFS client connected to file server 23 sends a write I/O request directed to a file of a file system stored on storage device 215 (step 350). If the write I/O request is a first request to update the file during the predetermined threshold time period, a new transaction is created by adding a new log entry in a file system transaction log 60 associated with the file system (step 370). The new log entry includes information regarding changes to metadata associated with the write I/O request (step 375). For example, in at least one embodiment of the current technique, the mtime attribute of the file is updated when the file is modified by a write I/O request. Thus, the new log entry includes a copy of the inode of the file including a current time stamp value as the updated mtime attribute of the file. The transaction represented by the new log entry is considered unfinished because no updates are applied to metadata of the file stored on the storage device 215 at the time the transaction is considered unfinished. Further, to mark the transaction as unfinished, a log hold is acquired on the new log entry (step 380). A log hold represents a reference taken on a log entry such that the log entry indicates the current position of the file system transaction log 60 indicating that the log entry is the first transaction to be replayed when file server 23 reboots or restarts due to a failure. Thus, if file server 23 restarts or reboots due to a failure, the new log entry that has been marked as an unfinished transaction is replayed to update metadata of the file stored on storage device 215 in order to ensure consistency of the file.

In at least one embodiment of the current technique, subsequent write I/O requests directed to the file during the predetermined threshold time period does not result into creation of new transactions in the file system transaction log 60. Instead, changes to metadata associated with the subsequent write I/O requests during the predetermined threshold time period are stored in a volatile memory of file server 23 (step 360). Metadata changes stored in the volatile memory includes a copy of the inode of the file. The mtime attribute included in the copy of the inode stored in the volatile memory is updated with a current timestamp value for each subsequent write I/O request. However, for each subsequent write I/O request, changes in contents of the file may be written directly to the file stored on the storage device 215 (step 365). The write I/O request completes successfully after contents of the file are updated (step 385). File system attributes update logic 63 monitors an amount of time elapsed since the last update applied to the file stored on storage device 215. If the amount of time elapsed is less than the predetermined threshold time period, file system attributes update logic 63 continues monitoring the time elapsed (step 390). If the amount of time elapsed is equal to the predetermined threshold time period, metadata changes stored in the volatile memory are copied to metadata stored on the storage device 215 (step 405). For example, in at least one embodiment of the current technique, the mtime attribute included in the inode of a file stored on storage device 215 is updated with a timestamp value included in the copy of the inode stored in the volatile memory. The predetermined threshold time period, for example in at least one embodiment, may be 30 seconds. Further, at the end of the predetermined threshold time period, the log entry of the file system transaction log 60 associated with the first write I/O request is marked as complete and finished (step 410). The log hold acquired on the log entry is released (step 415). The steps of copying of metadata changes from the volatile memory to the metadata stored on storage device 215, and marking a log entry as complete are also performed, when no space is left in the file system transaction log 60 to create a new log entry (step 395), or a subsequent write I/O request does not result in overwriting of contents of the file (step 400).

Referring now to FIG. 10, if file server 23 reboots or restarts after encountering a failure, log entries of the file system transaction log 60 are replayed to ensure that metadata changes stored in the file system transaction log 60 are consistent with metadata of the file stored on storage device 215. The file system transaction log 60 is replayed from its current position indicating the last valid log entry of the file system transaction log 60 (step 450). A record pointer is set to point to the last valid record of file system transaction log 60 (step 455). A log entry pointed to by the record is read from the file system transaction log 60 (step 460). Information stored in the log entry is applied to metadata of the file stored on storage device 215 (step 465). In at least one embodiment of the current technique, metadata such as the mtime attribute of a file stored in a log entry of the file system transaction log 60 indicates a timestamp value corresponding to a first write I/O request (also known as "base mtime") issued during the predetermined threshold time period. The timestamp value stored in the log entry is incremented by the predetermined threshold time period to account for all metadata changes (such as mtime updates) that may have occurred during the predetermined threshold time period, stored in the volatile memory, and lost due to reboot or restart of file server 23. The updated time stamp value derived by adding the predetermined threshold time period to a timestamp value stored in the log entry of log 60 is applied to metadata of the file stored on storage device 215 (step 470). Next, a determination is made whether the record is the last valid record of the file system transaction log 60 (step 475). If the record is the last valid record, the process of replaying of the file system transaction log 60 ends. If the record is not the last valid record of the file system transaction log 60, the record pointer is incremented to point to the next valid record in the file system transaction log (step 480).

Figure 11:
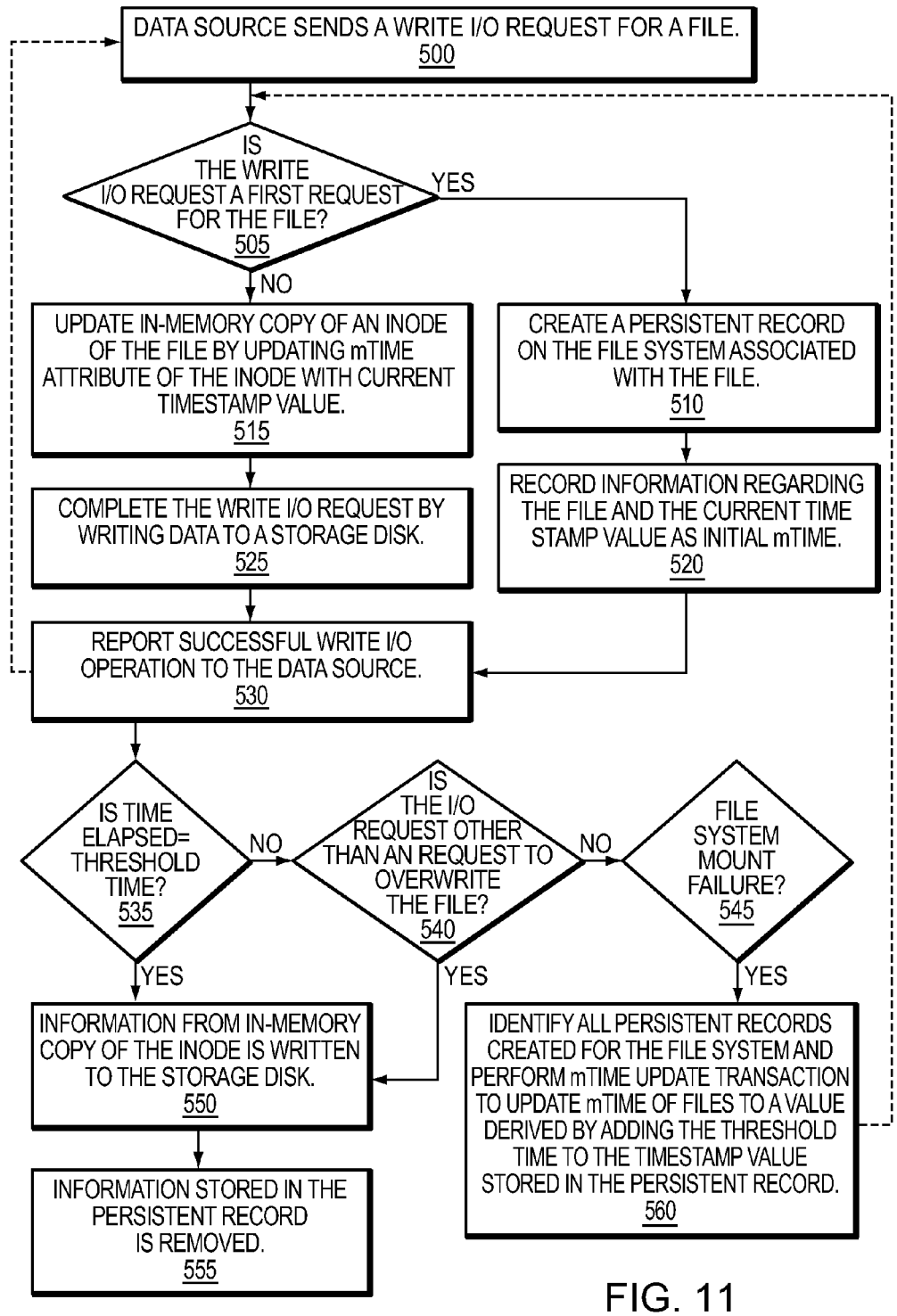

Referring to FIG. 11, shown is a more detailed flow diagram illustrating a method of managing updating of metadata of file systems in a data storage system. In at least one embodiment of the current technique, a persistent record may be created on a file system to store metadata changes for files of the file system. The persistent record for a file system may be created in a hidden file that is created under the hierarchy of the file system. With reference also to FIGS. 1 and 7, data source 200 such as a NFS client connected to file server 23 sends a write I/O request directed to a file of a file system stored on storage device 215 (step 500). If the write I/O request is a first I/O request to modify the file during the predetermined threshold time period (step 505), a new persistent record is created on storage device 215 for the file system (step 510). The new persistent record includes information that identifies the file associated with the write I/O request and a timestamp (e.g., mtime) of the file. The timestamp of the file stores a current timestamp value. For example, in one embodiment of the current technique, the mtime of a file stored in a persistent record indicates the time at which the file has been last modified (step 520).

In at least one embodiment of the current technique, subsequent write I/O requests directed to the file during the predetermined threshold time period does not result into creation of new persistent records for the file system. Instead, changes to metadata associated with the subsequent write I/O requests during the predetermined threshold time period are stored in a volatile memory of file server 23 (step 515).

Metadata changes stored in the volatile memory includes a copy of the inode of the file. The mtime attribute included in the copy of the inode stored in the volatile memory is updated with a current timestamp value for each subsequent write I/O request. However, for each subsequent write I/O request, changes in contents of the file may be written directly to the file stored on the storage device 215 (step 525). The write I/O request completes successfully after contents of the file are updated (step 530). File system attributes update logic 63 monitors an amount of time elapsed since the last update applied to the file stored on storage device 215. If the amount of time elapsed is less than the predetermined threshold time period, file system attributes update logic 63 continues monitoring the time elapsed (step 535). If the amount of time elapsed is equal to the predetermined threshold time period, metadata changes stored in the volatile memory are copied to metadata stored on the storage device 215 (step 550). For example, in at least one embodiment of the current technique, the mtime attribute included in the inode of the file stored on the storage device 215 is updated with a timestamp value included in the copy of the inode stored in the volatile memory. The predetermined threshold time period, for example in at least one embodiment, may be 30 seconds. Further, at the end of the predetermined threshold time period, the persistent record associated with the first write I/O request is erased or removed from storage device 215 (step 555). The steps of copying of metadata changes from the volatile memory to the metadata stored on storage device 215, and removing or erasing a persistent record are also performed when a subsequent write I/O request does not result in overwriting of contents of the file (step 540). If a user encounters a failure while mounting and accessing a file system (step 545), a persistent record created for the file system is identified. The timestamp value stored in the persistent record is increased by the predetermined threshold time period to account for all metadata changes (such as mtime updates) that may have occurred during the predetermined threshold time period, stored in the volatile memory, and lost due to the failure encountered by the user. The updated time stamp value derived by adding the predetermined threshold time period to a timestamp value stored in the persistent record is applied to metadata of the file stored on storage device 215 (step 560).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing updating of metadata of file systems, the method comprising:
   storing changes to metadata of a file of a file system in a journal upon receiving an I/O request for the file of the file system, wherein the I/O request results in update of metadata of the file of the file system, wherein the journal includes metadata transactions upon the file system, wherein the metadata of the file includes attributes of the file;
   storing subsequent changes to the metadata of the file in a volatile memory of a data storage system upon receiving subsequent I/O requests resulting in update of the metadata of the file of the file system, wherein the subsequent changes to the metadata are stored in the volatile memory of the data storage system by updating an in-memory copy of the metadata of the file instead of storing the subsequent changes to the metadata in the journal;
   upon elapse of a time interval, copying changes to the metadata of the file from the in-memory copy of the metadata stored in the volatile memory of the data storage system to an on-disk metadata of the file stored on a storage device; and
   upon determination of a failure in the data storage system, updating the on-disk metadata of the file of the file system by using information derived from the changes to the metadata stored in the journal.

2. The method of claim 1, wherein the journal includes a persistent record created on a file system.

3. The method of claim 1, wherein the journal includes a file system transaction log associated with a file system, wherein the file system transaction log is stored on a storage device.

4. The method of claim 1, wherein metadata of a file includes a last modification time, wherein the last modification time includes a timestamp value.

5. The method of claim 1, wherein deriving information from metadata changes stored in the journal further comprising:
   adding a threshold time period to a timestamp value included in metadata changes stored in the journal.

6. The method of claim 1, further comprising:
   determining, based on whether an amount of time elapsed since a last update to metadata of the file is less than a threshold time period, whether to update metadata of the file of the file system stored on a storage device; and
   based on the determination, copying changes to metadata of the file stored in the volatile memory to metadata of the file stored on the storage device.

7. The method of claim 1, further comprising:
   determining, based on whether a failure is detected in a data storage system, whether to update metadata of the file of the file system stored on a storage device; and
   based on the determination, updating metadata of the file of the file system with information derived from metadata changes stored in the journal.

8. The method of claim 1, further comprising:
   based on whether an I/O request received for the file of the file system is a first I/O request, adding a transaction to a file system transaction log associated with the file system, wherein the transaction includes a current timestamp value.

9. The method of claim 1, further comprising:
   based on whether an I/O request received for the file of the file system is a first I/O request, adding an entry to a persistent record associated with the file system, wherein the entry includes a current timestamp value and information of the file.

10. A system for use in managing updating of metadata of file systems, the system comprising:
    first logic storing changes to metadata of a file of a file system in a journal upon receiving an I/O request for the file of the file system, wherein the I/O request results in update of metadata of the file of the file system, wherein the journal includes metadata transactions upon the file system, wherein the metadata of the file includes attributes of the file;
    second logic storing subsequent changes to the metadata of the file in a volatile memory of a data storage system upon receiving subsequent I/O requests resulting in update of the metadata of the file of the file system, wherein the subsequent changes to the metadata are stored in the volatile memory of the data storage system by updating an in-memory copy of the metadata of the file instead of storing the subsequent changes to the metadata in the journal;

third logic copying, upon elapse of a time interval, changes to the metadata of the file from the in-memory copy of the metadata stored in the volatile memory of the data storage system to an on-disk metadata of the file stored on a storage device; and fourth logic updating, upon determination of a failure in the data storage system, the on-disk metadata of the file of the file system by using information derived from the changes to the metadata stored in the journal.

11. The system of claim 10, wherein the journal includes a persistent record created on a file system.

12. The system of claim 10, wherein the journal includes a file system transaction log associated with a file system, wherein the file system transaction log is stored on a storage device.

13. The system of claim 10, wherein metadata of a file includes a last modification time, wherein the last modification time includes a timestamp value.

14. The system of claim 10, wherein deriving information from metadata changes stored in the journal further comprising:

fifth logic adding a threshold time period to a timestamp value included in metadata changes stored in the journal.

15. The system of claim 10, further comprising:

fifth logic determining, based on whether an amount of time elapsed since a last update to metadata of the file is less than a threshold time period, whether to update metadata of the file of the file system stored on a storage device; and sixth logic copying, based on the determination, changes to metadata of the file stored in the volatile memory to metadata of the file stored on the storage device.

16. The system of claim 10, further comprising:

fifth logic determining, based on whether a failure is detected in a data storage system, whether to update metadata of the file of the file system stored on a storage device; and sixth logic updating, based on the determination, metadata of the file of the file system with information derived from metadata changes stored in the journal.

17. The system of claim 10, further comprising:

fifth logic adding, based on whether an I/O request received for the file of the file system is a first I/O request, a transaction to a file system transaction log associated with the file system, wherein the transaction includes a current timestamp value.

18. The system of claim 10, further comprising:

fifth logic adding, based on whether an I/O request received for the file of the file system is a first I/O request, an entry to a persistent record associated with the file system, wherein the entry includes a current timestamp value and information of the file.

* * * * *